United States Patent Office 3,794,622
Patented Feb. 26, 1974

3,794,622
DIVINYL ETHER-MALEIC ANHYDRIDE COPOLYMER
David S. Breslow, Wilmington, Del., assignor to Hercules Incorporated, Wilmington, Del.
No Drawing. Filed Dec. 22, 1971, Ser. No. 211,045
Int. Cl. C08f 15/02
U.S. Cl. 260—78.5 BB                    1 Claim

ABSTRACT OF THE DISCLOSURE

Uniform solid cyclic copolymers of divinyl ether and maleic anhydride, water-soluble on hydrolysis, have been found which are active in treating tumors and viruses but lack the undesirable side effects of the nonuniform prior art copolymers. These copolymers are characterized by containing divinyl ether and maleic anhydride in a mole ratio of about 1:2, having a number average molecular weight of from about 5000 to about 30,000 and a $M_w/M_n$ ratio of about 1.0 to about 3.0.

---

This invention relates to uniform cyclic copolymers of divinyl ether and maleic anhydride.

Copolymers of divinyl ether and maleic anhydride are well known in the art and have been described as retarding the growth of certain malignant tumors in U.S. Pat. No. 3,224,943, issued Dec. 21, 1965 and in treating foot-and-mouth disease virus in U.S. Pat. No. 3,624,218, issued Nov. 30, 1971. All of the copolymers recited in the prior art, including the above-mentioned patents, are inherently mixtures having a broad molecular weight distribution varying from very low molecular weight liquid or semisolid copolymers up to solid copolymers of quite high molecular weights. While the copolymers described in the prior art exhibit effectiveness in the treatment of certain tumors and viruses, they have not become commercially available therapeutic drugs because of certain undesirable side effects.

It has now surprisingly been found that uniform copolymers in a narrow range of molecular weight and having a narrow molecular weight distribution are outstandingly superior to the broad copolymer mixtures described in the prior art. In particular, these uniform copolymers are equal or superior in treating tumors and viruses, but lack the undesirable side effects. For example, the uniform copolymers exhibit equal or superior effects in treating Erhlich solid tumor and encephalomyocarditis virus with reduced acute toxicity, reduced sensitization to endotoxins, reduced incidence of anemia, reduced serum glutamine pyruvate transaminase levels, and reduction in the inhibition of aminopyrene metabolism. In addition to the above dramatic changes the uniform copolymers produce less whole body weight loss, less organomegaly—particularly with respect to the liver, lungs and spleen, and less depression of phagocytosis.

Certain relationships have been ascertained by which the uniformity and molecular weight distribution of these outstanding copolymers can be correlated with certain easily measured characteristics. Accordingly, the uniform copolymers of this invention are defined in simplified terms as being solid, cyclic copolymers of divinyl ether and maleic anhydride, soluble in water after hydrolysis, containing divinyl ether and maleic anhydride in a mole ratio of about 1:2, having a number average molecular weight ($M_n$), determined by the membrane osmotic method,[1] of from about 5000 to about 30,000, most preferably from about 10,000 to about 25,000 and a molecular weight distribution characterized by a $M_w/M_n$ ratio of from about 1. to about 3.0, most preferably from about 1.5 to about 2.5. Preferably the higher the average molecular weight the narrower should be the distribution. The $M_w/M_n$ ratio is a recognized measure of molecular weight distribution, where $M_w$ is weight average molecular weight, $M_n$ is number average molecular weight, both determined by the gel permeation chromatography method[2] carried out on the methyl ester derivative of the polymer. For a discussion of the $M_w/M_n$ ratio see Billmeyer Textbook of Polymer Science, p. 7, Interscience Publishers, Inc. (1966).

The prior art reports that divinyl ether-maleic anhydride copolymers can be produced by copolymerizing divinyl ether and maleic anhydride in an aromatic diluent at a mole ratio of about 1:2 using a free radical initiator (e.g., benzoyl peroxide, azobis(isobutyronitrile), etc.), the polymer precipitating from the solvent as it is formed. The copolymers are said to be cyclic and can be visualized as follows:

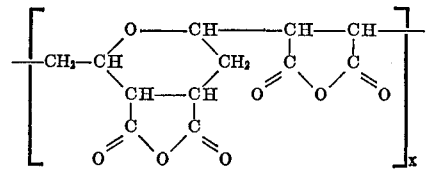

In point of fact, these prior art copolymers are invariably a broad mixture of individual copolymers molecules having molecular weights varying from very low to very high. By all prior art processes for copolymerizing divinyl ether and maleic anhydride, it is impossible to obtain uniform copolymers having a narrow molecular weight distribution within a narrow range of molecular weights.

The homogeneous copolymers of this invention are believed to have a cyclic structure as shown above, but must be prepared by special methods to obtain their specific molecular weight as well as narrow molecular weight distribution. There are several methods. For example, copolymers as described in the prior art can be fractionated such as by sand column fractionation, gel permeation chromatography, ultrafiltration, fractional precipitation, etc., or the copolymer can be degraded by heat or chemical reagents. Still another method is by a direct controlled solution polymerization of divinyl ether and maleic anhydride.

The following examples are presented to illustrate the copolymers of this invention.

EXAMPLE 1

In this example divinyl ether and maleic anhydride are copolymerized by a method as shown in the prior art and then separated into fractions by sand column fractionation.

A polymerization vessel is charged with 10.3 parts of maleic anhydride, 200 parts of dry benzene and 7.45 parts of carbon tetrachloride. After dissolution of the maleic anhydride, the solution is sparged with nitrogen and 3.7 parts of freshly distilled divinyl ether in 60 parts of benzene is added. The reaction vessel is heated to 80° C. and a solution of 0.073 part of benzoyl peroxide in 5.6

---

[1] Membrane osmometry was carried out at 30° C. in a high speed membrane osmometer using tetrahydrofuran as the solvent and a deacetyled acetyl cellulose membrane.

[2] The methyl ester samples were dissolved in tetrahydrofuran and injected through a 10µ filter into a gel permeation chromatograph equipped with a bank of four Styrogel columns having various pore sizes. Operating procedures and calculations were as described in J. Cazes, J. Chem. Ed., 43, A576, A625 (1966).

parts benzene is added with agitation. The reaction is maintained at a temperature of 80°–90° C. for four hours and the resulting slurry is then cooled to 25°–30° C. and the swollen copolymer removed. The product is repeatedly extracted with a mixture of 7.5 parts of benzene and 10 parts of hexane, filtered and vacuum dried. The resulting product is a broad mixture of cyclic, divinyl ether–maleic anhydride copolymers having a number average molecular weight of approximately 35,600 and an $M_w/M_n$ ratio of 7.64.

The above copolymer is fractionated on a sand column following the general procedure described by John H. Elliott in Polymer Fractionation, M. J. R. Cantow, editor, chapter B2, pp. 67–93, Academic Press, New York, N.Y. (1967).

In a mixture of 460 parts of methyl ethyl ketone and 105 parts of methyl isobutyl ketone is dissolved 28.7 parts of the above copolymer mixture. The resulting solution is poured onto a jacketed sand column at room temperature and an additional 60 parts of the mixed methyl ethyl ketone-methyl isobutyl ketone solvent is added as the copolymer solution goes onto the column. The column is then heated to 69° C. and allowed to stand at this temperature for one hour. Then hot benzene is passed through the column to remove the methyl ethyl ketone-methyl isobutyl ketone mixed solvent. The column is allowed to cool to room temperature and then the copolymer fractionated using a tetrahydrofuran-n-hexane mixed solvent. The proportions of tetrahydrofuran to n-hexane are varied throughout the process, starting with 70% tetrahydrofuran, 30% n-hexane, and increasing tetrahydrofuran proportions throughout the fractionation so that at the end of the fractionation pure tetrahydrofuran is being used. Eight fractions, each amounting to approximately two liters are obtained. Each fraction is partially evaporated and the copolymer precipitated by the addition of dry benzene. The number average molecular weight and $M_w/M_n$ ratio of the fractions is tabulated below.

| Fraction: | Number average molecular weight[1] (Mn) | Mw/Mn ratio[2] |
|---|---|---|
| a | 16,700 | 1.66 |
| b | 29,400 | 1.84 |
| c | 36,200 | 2.25 |
| d | 45,300 | 2.16 |
| e | 71,300 | 2.35 |
| f | 95,500 | 2.59 |
| g | 117,000 | 3.21 |
| h | 203,000 | 4.21 |

[1] Determined by membrane osomotic method.
[2] Determined by gel permeation chromatographic method.

EXAMPLE 2

In this example samples of the fractions from Example 1 as well as a sample of the nonuniform parent copolymer are tested to determine percent tumor inhibition.

In each test 10 male white Swiss mice are given an intravenous injection of the copolymer in isotonic saline solution (2.5 mg./ml. concentration) adjusted to a pH of 7.2. After 24 hours they are given a second injection. Each injection contains 25 mg. of copolymer/kg. of body weight. Approximately 48 hours after the second injection of copolymer, each mouse is injected subcutaneously with $10^7$ Erhlich adenocarcinoma solid tumor cells in saline. The tumors are removed after 10 days and weighed. Percent tumor inhibition is determined by comparing the average weights of tumors removed from copolymer treated mice with the average weight of tumors removed from a group of 10 control mice treated exactly the same way except for the copolymer treatment. The results are tabulated below.

| Copolymer | Mn | Mw/Mn | Percent inhibition |
|---|---|---|---|
| Parent copolymer (before fractionation) | 35,600 | 7.64 | 50 |
| a | 16,700 | 1.66 | 61 |
| b | 29,400 | 1.84 | 45 |
| c | 36,200 | 2.25 | 45 |
| d | 45,300 | 2.16 | 67 |
| f | 95,500 | 2.59 | 32 |
| h | 203,000 | 4.21 | 75 |

From the above it can be seen that all the fractions and the parent copolymer exhibit activity in tumor inhibition.

EXAMPLE 3

In this example samples of the fractions from Example 1 as well as a sample of the parent copolymer are tested for antiviral activity.

In each test 10 male white Swiss mice are given a single intravenous injection of the copolymer in isotonic saline exactly as described in Example 2. After 24 hours they are each challenged with an intravenous injection of approximately 50 times the $LD_{50}$ of encephalomyocarditis virus. Percent mortality is determined on the thirteenth day following challenge with the virus. The results are tabulated below.

| Copolymer | Mn | Mn/Mn | Percent mortality |
|---|---|---|---|
| Parent copolymer (before fractionation) | 35,600 | 7.64 | 10 |
| Control: | | | |
| a | 16,700 | 1.66 | 90 |
| b | 29,400 | 1.84 | 30 |
| c | 36,200 | 2.25 | 10 |
| d | 45,300 | 2.16 | 10 |
| e | 71,300 | 2.35 | 20 |
| f | 95,500 | 2.59 | 20 |
| g | 117,000 | 3.21 | 20 |

From the above tabulation it can be seen that all the fractions and the parent copolymer exhibit antiviral activity.

EXAMPLE 4

This example illustrates the effect of samples of the fractions from Example 1 and the parent copolymer on whole body weight and on the weight of various body organs.

In the tests for whole body weight, groups of 10 male white Swiss mice are used in each test with 10 mice in the control. In the tests for hepatomegally (liver enlargement), splenomegaly (spleen enlargement), lung weight and thymus weight, groups of five male white Swiss mice are used with 10 mice in each control. The copolymer is administered by single intravenous injection—25 mg. of copolymer/kg. of body weight as described in Example 2. In the tests for whole body weight, the average weight of each group one week after copolymer treatment is compared with the average weight of each group before treatment. In the tests for hepatomegaly, splenomegaly, lung weight and thymus weight the average weight of the organ within each group, is compared to average whole body weight, within each group. The results are tabulated below.

| Copolymer | Mn | Mw/Mn | Whole body weight change | | As percent of body weight | | | |
|---|---|---|---|---|---|---|---|---|
| | | | Grams | Percent | Liver weight | Spleen weight | Lung weight | Thymus weight |
| Control | | | +2.1 | +9.5 | 6.1 | 0.34 | 0.76 | 0.24 |
| Parent Copolymer (before fractionation) | 35,600 | 7.64 | −4.0 | −18.1 | 7.1 | 1.35 | 1.29 | 0.15 |
| a | 16,700 | 1.66 | +1.8 | +8.2 | 6.5 | 0.63 | 0.89 | 0.22 |
| b | 29,400 | 1.84 | +0.2 | +0.9 | 6.5 | 0.71 | 1.15 | 0.20 |
| c | 36,200 | 2.25 | −2.6 | −11.8 | 6.6 | 0.59 | 1.31 | 0.16 |
| e | 71,300 | 2.35 | −0.5 | −2.3 | 8.0 | 1.46 | 1.22 | 0.18 |
| g | 117,000 | 3.21 | −1.7 | −7.7 | 8.0 | 1.15 | 1.21 | .16 |

From the above tabulation it can be seen that the higher molecular weight copolymers as well as the parent copolymer cause a marked decrease in whole body weight and thymus weight and a marked increase in the weight of the liver, spleeen and lungs. In comparison, the copolymers of this invention cause little change in whole body weight or organ weight.

EXAMPLE 5

In this example samples of fractions from Example 1 and a sample of the parent copolymer are tested for acute toxicity.

Standard tests to determine $LD_{50}$ by intravenous injection are run on white male Swiss mice. By the term "$LD_{50}$" is meant lethal dose to 50% of the animals being tested. The results in terms of mg. copolymer per kg. body weight are tabulated below.

| Copolymer | $M_n$ | $M_w/M_n$ | L.D.$_{50}$ (mg./kg.) |
|---|---|---|---|
| Parent copolymer (before fractionation) | 35,600 | 7.64 | 74 |
| a | 16,700 | 1.66 | 131 |
| c | 36,200 | 2.25 | 100 |
| e | 71,300 | 2.35 | 87 |

From the above tabulation it can be seen that the higher molecular weight copolymers as well as the parent copolymer are more toxic than the copolymers of this invention.

EXAMPLE 6

In this example samples of fractions from Example 1 and a sample of the parent copolymer are tested for anemia-causing properties.

In each test five male white Swiss mice are given a single intravenous injection of the copolymer (25 mg./kg. body weight) in saline exactly as described in Example 2. A control group of 25 male white Swiss mice is treated exactly the same except saline solution is substituted for the copolymer injection. One week later blood samples are taken and the grams of hemoglobin per 100 ml. of blood determined. The results in terms of grams percent hemoglobin are tabulated below.

| Copolymer | $M_n$ | $M_w/M_n$ | Hemoglobin levels (g. percent) |
|---|---|---|---|
| Control | | | 16.8 |
| Parent Copolymer (before fractionation) | 35,600 | 7.64 | 12.8 |
| a | 16,700 | 1.66 | 16.3 |
| b | 29,400 | 1.84 | 15.3 |
| c | 36,200 | 2.25 | 14.8 |
| e | 71,300 | 2.35 | 12.2 |
| g | 117,000 | 3.21 | 11.7 |

It can be seen from the above tabulation that all of the copolymers having a molecular weight above the molecular weight of the copolymers of this invention, including the parent copolymer, cause a marked reduction in hemoglobin levels.

EXAMPLE 7

This example illustrates the effect of samples of fractions from Example 1 and the parent copolymer on liver functions. Two tests are conducted.

The first test is to determine serum glutamine pyruvate transaminase levels 24 hours after intravenous injection of the copolymers (25 mg. of copolymer/kg. of body weight). There are five white male Swiss mice in each group and eight in the control. The determination is a colorimetric test described in the Sigma Technical Bulletin No. 505 (revised March 1971), Sigma Chemical Co., St. Louis, Mo. Results are tabulated below in terms of Sigma-Frankel units, as described in the Sigma Technical Bulletin). An increase in the number of units to about 100 or above indicates liver necrosis.

The second test is to determine hepatic microsomal enzyme activity 24 hours after intravenous injection of the copolymers (25 mg. of copolymer/kg. of body weight). There are five white male Swiss mice in each group and five in the control. The livers are removed from the mice 24 hours after injection with the copolymer, centrifuged at 9000 times gravity and the supernatant liquid collected. The supernatant liquid contains enzymes which have the ability to convert aminopyrene to formaldehyde. An inhibition of the enzymes indicates liver damage. Results are given in terms of percent inhibition of aminopyrene metabolism.

| Copolymer | $M_n$ | $M_w/M_n$ | Sigma Frankel units | Percent inhibition of aminopyrine metabolism |
|---|---|---|---|---|
| Control | | | 32 | 0 |
| Parent Copolymer (before fractionation) | 35,600 | 7.64 | 200 | 64 |
| a | 16,700 | 1.66 | 52 | 0 |
| b | 29,400 | 1.84 | 87 | 7.1 |
| c | 36,200 | 2.25 | 93 | 29.5 |
| d | 45,300 | 2.16 | (¹) | 51.8 |
| e | 71,300 | 2.35 | 96 | 56.5 |
| g | 117,000 | 3.21 | 205 | 53 |

¹ Not determined.

It can be seen from the above tabulation that all of the copolymers having a molecular weight above the level of this invention adversely affect the liver.

EXAMPLE 8

This example illustrates the effect of the fractions from Example 1 and the nonhomogeneous parent copolymer in inducing sensitization to endotoxin.

Groups of 25 or more male white Swiss mice are given a single intravenous injection of the copolymer (25 mg. of copolymer/kg. of body weight); 24 hours later subgroups of five mice each are challenged with varying concentration of *Salmonella typhosa* endotoxin and the $LD_{50}$ (lethal dose to 50%) determined. The resultant sensitization to endotoxin is tabulated below in terms of $LD_{50}$ as miligrams of *Salmonella typhosa* endotoxin/kg. of body weight.

| Copolymer | $M_n$ | $M_w/M_n$ | Sensitization to endotoxin, $LD_{50}$, Mg./kg. |
|---|---|---|---|
| Control | | | 34 |
| Parent copolymer (before fractionation) | 35,600 | | 0.38 |
| a | 16,700 | 1.66 | >15 |
| b | 29,400 | 1.84 | 3.0 |
| c | 36,200 | 2.25 | 0.38 |
| d | 45,300 | 2.16 | 0.48 |
| e | 71,300 | 2.35 | 0.48 |
| f | 95,500 | 2.59 | 0.48 |
| g | 117,000 | 3.21 | 0.48 |
| h | 203,000 | 4.21 | 0.48 |

It can be seen from the above tabulation that sensitization to endotoxin (as shown by a decrease in $LD_{50}$) markedly increases with copolymers having a molecular weight above 30,000.

EXAMPLE 9

This example illustrates the effect of molecular weight and molecular weight distribution of sample copolymers on various biological activities.

Samples of eight copolymers having the following molecular weights and $M_w/M_n$ ratios are tested.

Copolymer sample:
   A        Molecular weight below the range of this invention, $M_w/M_n$ ratio within range of this invention.
   B        Molecular weight below the range of this invention, $M_w/M_n$ ratio outside the range of this invention.

Copolymer sample:
- C ------ Molecular weight and $M_w/M_n$ ratio within the range of this invention.
- D ------ Molecular weight and $M_w/M_n$ ratio within the range of this invention.
- E ------ Molecular weight within the range of this invention, $M_w/M_n$ ratio outside the range of this invention.
- F ------ Molecular weight above the range of this invention $M_w/M_n$ ratio within the range of this invention.
- G ------ Molecular weight above the range of this invention, $M_w/M_n$ ratio outside the range of this invention.

Each sample is tested to determine its effect on antitumor activity, antiviral activity, acute toxicity, sensitivty to endotoxin, Serum Frankel units, hemoglobin level, hepatomegaly, and splenomegaly according to the procedures described in the preceding examples. In addition the white blood cell count was determined. In this test there are five mice in each group and 25 in the control. One week after a single intravenous injection of copolymer, blood samples are taken and the number of white blood cells per cubic millimeter are determined. The results are tabulated below.

| Copolymer sample | $M_n$ | $M_w/M_n$ | Tumor inhibition, percent | Antiviral activity, percent mortality | Acute toxicity $LD_{50}$, mg./kg. | Sensitivity to endotoxin, $LD_{50}$, mg./kg. | Sigma Frankel units | Hemoglobin levels, grams percent | White blood cells/ mm. | Liver weight as percent of body weight | Spleen weight as percent of body weight |
|---|---|---|---|---|---|---|---|---|---|---|---|
| A | 3,500 | 2.62 | 41 | 60 | (a) | >15 | 34 | (a) | (a) | (a) | (a) |
| B | 1,500 | 11.0 | 65 | 60 | 126 | >15 | 32 | 16.6 | 7,520 | 5.4 | 0.52 |
| C | 6,800 | 2.34 | (a) | 20 | (a) | >15 | (a) | (a) | (a) | (a) | (a) |
| D | 16,700 | 1.66 | 61 | 20 | 131 | >15 | 52 | 16.3 | 7,300 | 6.5 | 0.63 |
| E | 16,800 | 4.45 | 67 | 10 | 96 | 0.68 | >120 | 13.2 | 11,450 | 7.0 | 1.14 |
| F | 71,300 | 2.35 | 55 | 20 | 87 | 0.48 | 96 | 12.2 | 10,600 | 8.0 | 1.46 |
| G | 35,600 | 7.6 | 62 | 10 | 74 | 0.38 | >120 | 12.3 | 13,500 | 8.4 | 1.27 |
| Control | | | 0 | 93 | | | 34 | 29 | 16.8 | 6,466 | 4.8 | 0.37 | a Not determined.

The samples are prepared as follows.

Copolymer sample:
- A ------ Direct solution polymerization.
- B ------ Direct copolymerization using general procedure described in U.S. Pat. No. 3,224,943 to Espy.
- C ------ Direct solution polymerization.[1]
- D ------ Sand column fractionation.[2]
- E ------ Direct copolymerization by the general process described in U.S. Pat. No. 3,224,943 to Espy.
- F ------ Sand column fractionation.
- G ------ Direct copolymerization by the general process described in U.S. Pat. No. 3,224,943 to Espy.

[1] Polymerization vessel is charged with 14.8 parts maleic anhydride and 160 parts tetrahydrofuran. The solution is sparged with nitrogen and 5.3 parts divinyl ether in 17.7 parts tetrahydrofuran added. Reaction solution cooled to 15° C. blanketed with nitrogen and irradiated with a sunlamp (both U.V. and visible light) for 90 minutes while maintaining temperatures at 15–20° C. At the end of the 90 minutes 132 parts n-hexane is added to the solution to precipitate the copolymer. The copolymer is separated by centrifuging and decanting, washed repeatedly with a 3.3:1 mixture of benzene and n-hexane, filtered and dried under a stream of nitrogen.
[2] As described in Example 1.

What I claim and desire to protect by Letters Patent is:

1. A solid cyclic copolymer of divinyl ether and maleic anhydride, water-soluble on hydrolysis, containing divinyl ether and maelic anhydride in a mole ratio of about 1:2, having a number average molecular weight of from 5000 to about 30,000 and a $M_w/M_n$ ratio of from about 1.0 to about 3.0.

References Cited

UNITED STATES PATENTS

| | | | |
|---|---|---|---|
| 3,085,077 | 4/1963 | Floyd | 260—29.7 |
| 3,224,943 | 12/1965 | Espy | 167—78 |
| 3,624,218 | 11/1971 | Regelson | 424—78 |

JOSEPH L. SCHOFER, Primary Examiner

J. KIGHT, Assistant Examiner

U.S. Cl. X.R.

424—78

UNITED STATES PATENT OFFICE
CERTIFICATE OF CORRECTION

PO-1050
(5/69)

Patent No. 3,794,622　　　　　　　　Dated February 26, 1974

Inventor(s) David S. Breslow

It is certified that error appears in the above-identified patent and that said Letters Patent are hereby corrected as shown below:

Column 4, Example 3, <u>in the Table</u> under Percent Mortality

"90" is omitted opposite "Control."

In line "a" - --90-- should read "20"

Column 4, Example 4, <u>in the Table</u>, Line "g", under Thymus weight

--.16-- should read "0.16"

Signed and sealed this 18th day of June 1974.

(SEAL)
Attest:

EDWARD M. FLETCHER, JR.　　　　　　C. MARSHALL DANN
Attesting Officer　　　　　　　　　　Commissioner of Patents